US 9,903,276 B2

(12) United States Patent
Hotta (10) Patent No.: US 9,903,276 B2
(45) Date of Patent: Feb. 27, 2018

(54) PREHEATING DEVICE FOR GAS TURBINE FUEL, GAS TURBINE PLANT PROVIDED THEREWITH, AND PREHEATING METHOD FOR GAS TURBINE FUEL

(71) Applicant: MITSUBISHI HITACHI POWER SYSTEMS, LTD., Kanagawa (JP)

(72) Inventor: Katsuhiro Hotta, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 265 days.

(21) Appl. No.: 14/768,852

(22) PCT Filed: Mar. 12, 2014

(86) PCT No.: PCT/JP2014/056477
§ 371 (c)(1),
(2) Date: Aug. 19, 2015

(87) PCT Pub. No.: WO2014/156645
PCT Pub. Date: Oct. 2, 2014

(65) Prior Publication Data
US 2016/0003159 A1  Jan. 7, 2016

(30) Foreign Application Priority Data
Mar. 25, 2013  (JP) ................................ 2013-062276

(51) Int. Cl.
*F02C 7/224* (2006.01)
*F01K 23/10* (2006.01)
(Continued)

(52) U.S. Cl.
CPC ............... *F02C 7/224* (2013.01); *F01K 7/22* (2013.01); *F01K 23/10* (2013.01); *F02C 3/04* (2013.01);
(Continued)

(58) Field of Classification Search
CPC .. F02C 7/14; F02C 7/224; F01K 23/10; F01K 7/22
See application file for complete search history.

(56) References Cited

U.S. PATENT DOCUMENTS

| 3,038,308 A | 6/1962 | Fuller |
| 4,932,204 A * | 6/1990 | Pavel ...................... F01K 23/10 |
| | | 60/39.182 |

(Continued)

FOREIGN PATENT DOCUMENTS

| CN | 1447878 | 10/2003 |
| CN | 101644192 | 2/2010 |

(Continued)

OTHER PUBLICATIONS

First Office Action dated Mar. 30, 2016 in corresponding Chinese Patent Application No. 201480009678.4, with English language translation.

(Continued)

*Primary Examiner* — Steven Sutherland
(74) *Attorney, Agent, or Firm* — Wenderoth, Lind & Ponack, L.L.P.

(57) ABSTRACT

This fuel-preheating device is provided with the following: a cooling-steam line that supplies steam, for the purposes of cooling, to a hot part of a gas turbine, namely a combustion liner of a combustor; a superheated-steam line through which superheated steam that is steam having passed through the combustion liner of the combustor flows; and a preheater that receives the superheated steam from the superheated-steam line and preheats fuel to be supplied to the combustor by exchanging heat between the superheated steam and said fuel.

10 Claims, 6 Drawing Sheets

(51) Int. Cl.
  *F01K 7/22* (2006.01)
  *F02C 3/04* (2006.01)
  *F02C 7/14* (2006.01)
(52) U.S. Cl.
  CPC ............ *F02C 7/14* (2013.01); *F05D 2220/32* (2013.01); *F05D 2240/35* (2013.01); *F05D 2260/2322* (2013.01)

(56) References Cited

U.S. PATENT DOCUMENTS

| | | | |
|---|---|---|---|
| 5,826,430 A | 10/1998 | Little | |
| 6,269,626 B1 * | 8/2001 | Kim | F01K 23/106 122/7 B |
| 6,499,302 B1 * | 12/2002 | Ranasinghe | F01K 23/106 60/39.182 |
| 2005/0172639 A1 * | 8/2005 | Yamanaka | F02C 3/20 60/780 |

FOREIGN PATENT DOCUMENTS

| | | |
|---|---|---|
| JP | 10-131719 | 5/1998 |
| JP | 10-159584 | 6/1998 |
| JP | 10-306708 | 11/1998 |
| JP | 2000-509456 | 7/2000 |
| JP | 2008-215184 | 9/2008 |

OTHER PUBLICATIONS

International Search Report dated Jun. 17, 2014 in corresponding International Application No. PCT/JP2014/056477.

Written Opinion of the International Searching Authority dated Jun. 17, 2014 in corresponding International Application No. PCT/JP2014/056477.

* cited by examiner

PREHEATING DEVICE FOR GAS TURBINE FUEL, GAS TURBINE PLANT PROVIDED THEREWITH, AND PREHEATING METHOD FOR GAS TURBINE FUEL

TECHNICAL FIELD

The present invention relates to a preheating device for gas turbine fuel of a gas turbine that includes a plurality of combustors that combusts fuel to generate combustion gas, and a turbine driven by combustion gas, a gas turbine plant provided therewith, and a preheating method for gas turbine fuel. This application claims priority based on Japanese Patent Application No. 2013-062276 filed in Japan on Mar. 25, 2013, of which the contents are incorporated herein by reference.

BACKGROUND ART

A gas turbine includes a compressor that compresses air, a plurality of combustors that combusts fuel in the air compressed by the compressor to generate combustion gas, and a turbine that is driven by the combustion gas. The fuel supplied to the combustors is often preheated before being supplied to the combustors to increase the combustion efficiency in the combustors.

Patent Document 1 below discloses a gas turbine plant that preheats fuel supplied to a combustor. This gas turbine plant includes a gas turbine, a heat recovery boiler that generates steam by the heat of exhaust gas from this gas turbine, a steam turbine that is driven by steam generated by this heat recovery boiler, and a preheater that heats the fuel to be supplied to the combustor. A first steam line that supplies the steam generated by the heat recovery boiler as a fuel heat source of the preheater is connected to the preheater. Furthermore, a second steam line that introduces steam that heated the fuel into a transition piece of the combustor is connected to this preheater. In addition, a third steam line that introduces the steam that cooled this transition piece into the steam turbine is connected to the transition piece of the combustor. This gas turbine plant further includes an attemperation spray line that sprays water on the second steam line to cool the steam that flows through the second steam line, that is, the steam that heated the fuel.

CITATION LIST

Patent Document

Patent Document 1: Japanese Unexamined Patent Application Publication No. H10-131719A

SUMMARY OF INVENTION

Technical Problem

According to the technique described in Patent Document 1 listed above, since the steam that heated the fuel is cooled by water and then supplied to the transition piece of the combustor, the heat of the steam that heated the fuel cannot be utilized effectively and the thermal efficiency of the gas turbine plant overall is not very good.

In addition, in the stage when steam is not being generated in the heat recovery boiler at the time of gas turbine activation in the gas turbine plant, the fuel is expected to be heated by steam from an external source. In this case as well, the transition piece of the combustor is cooled by the steam that heated the fuel, and then the high-temperature steam is supplied to the steam turbine. Nevertheless, in the stage when the steam turbine is not being driven, this small amount of high-temperature steam does not contribute to the driving of the steam turbine even when supplied to the steam turbine. As a result, the heat held by the high-temperature steam is wasted. Thus, according to the technique described in the above Patent Document 1, the thermal efficiency is not good from this perspective as well.

Therefore, an object of the present invention is to provide a preheating device for gas turbine fuel capable of increasing the thermal efficiency of the gas turbine plant overall, a gas turbine plant provided therewith, and a preheating method for gas turbine fuel.

Solution To Problem

According to an aspect of the present invention for resolving the above-described problems, a preheating device for gas turbine fuel includes:

a cooling-steam line that supplies steam, for the purpose of cooling, to a hot part of either a combustor that combusts fuel to generate combustion gas or a turbine that is driven by the combustion gas, the hot part being a part that contacts the combustion gas; a superheated-steam line through which superheated steam flows, the superheated steam being the steam that has passed through the hot part; and a preheater that preheats the fuel by exchanging heat between the superheated steam supplied from the superheated-steam line and the fuel supplied to the combustor.

According to the preheating device, fuel is heated by the superheated steam superheated by the cooling of the combustor, making it possible to effectively utilize the heat of the combustor. Thus, according to the preheating device, it is possible to increase the thermal efficiency of the gas turbine plant overall.

Here, in the preheating device for gas turbine fuel, the preheater may condense the superheated steam by heat exchange between the superheated steam and the fuel.

According to the preheating device, the superheated steam is condensed when the fuel is heated, making it possible to thoroughly utilize the heat held by the superheated steam. In addition, according to the preheating device, the superheated steam is condensed by heat exchange with the fuel, making it possible to increase the heat exchange rate between the superheated steam and fuel and reduce the size of the preheater.

In addition, the preheating device for gas turbine fuel according to any one of the above may further include a plurality of the preheaters and a fuel line that connects in series the plurality of preheaters so that the fuel sequentially flows into the plurality of preheaters, the superheated-steam line supplying the superheated steam to each of the plurality of preheaters.

Furthermore, the preheating device for gas turbine fuel according to any one of the above may further include a first-stage steam line through which steam that does not pass through the hot part flows, a first-stage preheater that preheats the fuel by heat exchange between the steam supplied from the first-stage steam line and the fuel supplied to the combustor, and a fuel line that connects the first-stage preheater and a second-stage preheater, the second-stage preheater being the preheater, so that the fuel preheated by the first-stage preheater is supplied to the second-stage preheater.

Thus, according to the preheating device that includes a plurality of the preheaters, fuel is heated in two stages, making it possible to supply higher-temperature fuel to the combustor and increase the fuel combustion efficiency in the combustor.

In addition, the preheating device for gas turbine fuel according to any one of the above may further include a branch steam line that branches from the superheated-steam line and introduces a portion of the superheated steam that flows through the superheated-steam line to the outside of the preheating device; a cooling-steam regulating valve that regulates a flow rate of the steam supplied to the hot part via the cooling stream line; and a superheated-steam regulating valve that controls a flow rate of the superheated steam supplied to the preheater via the superheated-steam line.

According to the preheating device, although the superheated-steam line is connected in series to the cooling-steam line via the hot part, it is possible to respectively regulate a flow rate of the steam supplied to the hot part via the cooling-steam line, and a flow rate of the superheated steam that flows into the preheater via the superheated-steam line.

According to an aspect of the present invention for resolving the above-described problems, a gas turbine plant includes:

the preheating device for gas turbine fuel according to any one of the above; a gas turbine that includes the combustor and the turbine; a steam generating source that generates steam; a condenser that turns the steam generated by the steam generating source back into water; a water supply line that supplies water generated by the condenser to the steam generating source; and a water recovery line that supplies the water condensed from the superheated steam by heat exchange between the superheated steam and the fuel in the preheater to the condenser or the water supply line, the cooling-steam line supplying steam generated by the steam generating source to the hot part.

The gas turbine plant includes the preheating device for gas turbine fuel according to any one of the above, thereby making it possible to increase the thermal efficiency of the gas turbine plant overall.

Here, in the gas turbine plant, the steam generating source may include a heat recovery boiler that generates steam by the heat of the exhaust gas from the turbine.

In addition, according to another aspect of the present invention for resolving the above-described problems, a gas turbine plant includes:

the preheating device for gas turbine fuel that includes the branch steam line; a gas turbine that includes the combustor and the turbine; a heat recovery boiler that generates steam by the heat of exhaust gas from the turbine; a steam turbine that is driven by the steam generated by the heat recovery boiler; a condenser that turns the steam that drove the steam turbine back into water; a water supply line that supplies the water generated by the condenser to the heat recovery boiler; and a water recovery line that supplies the water condensed from the superheated steam by heat exchange between the superheated steam and the fuel in the preheater to the condenser or the water supply line.

The heat recovery boiler includes a steam generating part that generates steam by the heat of the exhaust gas, and a reheating part that superheats the steam generated by the steam generating part and sends the superheated steam to the steam turbine, the cooling-steam line supplying the steam generated by the steam generating part, before being superheated by the reheating part, to the hot part, and the branch steam line introducing the superheated steam into the steam turbine.

According to the gas turbine plant, excess superheated steam not used for preheating fuel is supplied to the steam turbine via the branch steam line, making it possible to effectively utilize excess superheated steam as well.

Here, in the gas turbine plant according to any one of the above, the steam generating source may include an auxiliary boiler that generates steam by a heat source different from the exhaust gas from the turbine.

According to the gas turbine plant, it is possible to preheat fuel while cooling the hot part even in a case where the gas turbine plant does not include a heat recovery device or a case where the gas turbine plant includes a heat recovery device but the heat recovery device is not steadily operating since the gas turbine is in an activation stage.

In addition, according to yet another aspect of the present invention for resolving the above-described problems, a gas turbine plant includes:

the preheating device for gas turbine fuel that includes the branch steam line; a gas turbine that includes the combustor and the turbine; an auxiliary boiler that generates steam by a heat source different from exhaust gas from the turbine; a condenser that turns the steam generated by the auxiliary boiler back into water; a water supply line that supplies water generated by the condenser to the auxiliary boiler; and a water recovery line that sends water condensed from the superheated steam by heat exchange between the superheated steam and the fuel in the preheater to the condenser or the water supply line, the cooling-steam line supplying steam generated by the auxiliary boiler to the hot part, and the branch steam line introducing the superheated steam into the condenser.

In addition, according to an aspect of the present invention for resolving the above-described problems, a preheating method for gas turbine fuel includes:

a cooling steam supplying step for supplying steam, for the purpose of cooling, to a hot part of either a combustor that combusts fuel to generate combustion gas or a turbine that is driven by the combustion gas, the hot part being a part that contacts the combustion gas; and a fuel preheating step for preheating the fuel by exchanging heat between superheated steam, the superheated steam being the steam that has passed through the hot part, and the fuel supplied to the combustor.

According to the preheating method, fuel is heated by superheated steam superheated by the cooling of the combustor, making it possible to effectively utilize the heat of the combustor. Thus, according to the preheating method, it is possible to increase the thermal efficiency of the gas turbine plant overall.

Here, in the preheating method for gas turbine fuel, the superheated steam may be condensed by heat exchange with the fuel in the fuel preheating step.

According to the preheating method, the superheated steam is condensed when the fuel is heated, making it possible to thoroughly utilize the heat held by the superheated steam. Furthermore, according to the preheating method, the superheated steam is condensed by heat exchange with the fuel, making it possible to increase the heat exchange rate between the superheated steam and the fuel.

Advantageous Effect of Invention

According to an aspect of the present invention, the fuel is heated by the superheated steam superheated by the cooling of the combustor, making it possible to effectively utilize the heat of the combustor. Thus, according to an aspect of the present invention, it is possible to increase the thermal efficiency of the gas turbine plant overall. In addition, according to an aspect of the present invention, it is possible to suppress an increase in running costs while suppressing a decrease in output of the gas turbine.

DESCRIPTION OF EMBODIMENTS

The following describes various embodiments and various modifications of a gas turbine plant according to the present invention, with reference to the drawings.

First Embodiment

First, a first embodiment of a gas turbine plant according to the present invention will be described with reference to FIG. 1 and FIG. 2.

Figure 1:
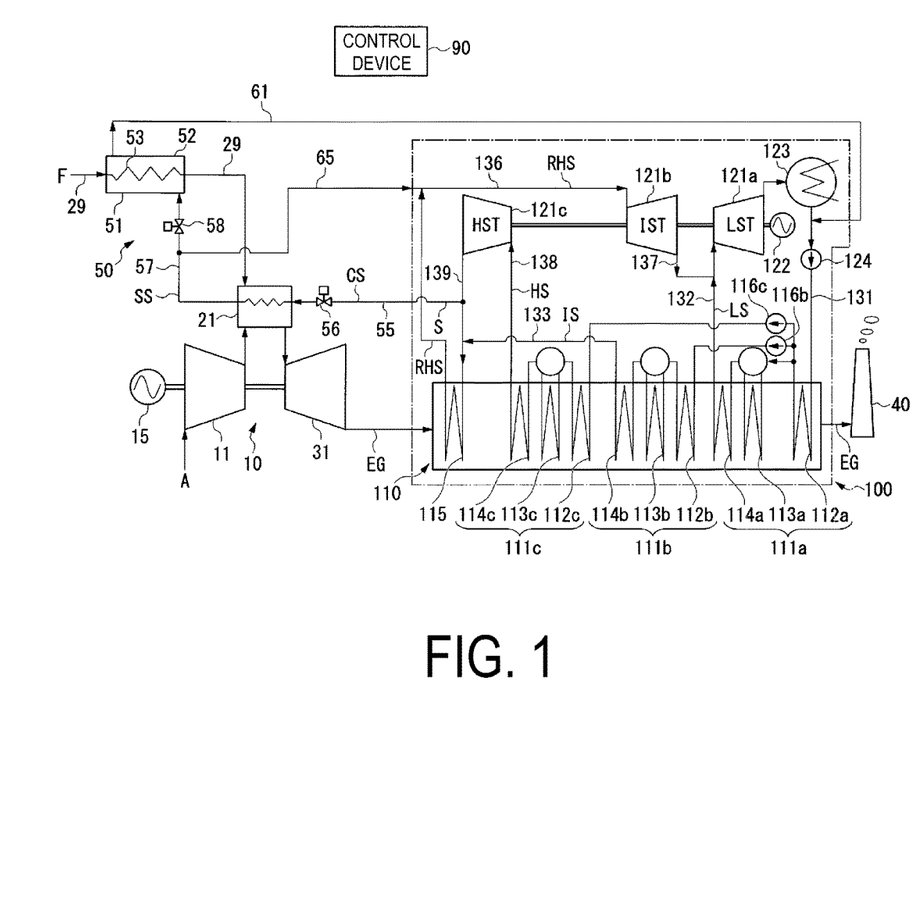
FIG. 1 is a system diagram illustrating a gas turbine plant of a first embodiment according to the present invention.

The gas turbine plant of this embodiment, as illustrated in FIG. 1, includes a gas turbine 10, a generator 15 that generates power by the driving of the gas turbine 10, a heat recovery device 100 that generates steam by the heat of an exhaust gas EG exhausted from the gas turbine 10, a chimney 40 that releases the exhaust gas EG that has passed through the heat recovery device 100 into the atmosphere, a fuel-preheating device 50 that preheats the fuel supplied to the gas turbine 10, and a control device 90 that controls the gas turbine 10, the fuel-preheating device 50, and the like.

The gas turbine 10 includes a compressor 11 that compresses air, a plurality of combustors 21 that combusts a fuel F in the air compressed by the compressor 11 to generate combustion gas, and a turbine 31 that is driven by the high-temperature, high-pressure combustion gas. A turbine rotor of the turbine 31 and a compressor rotor of the compressor 11 rotate around the same axial line, and are connected to each other to form a gas turbine rotor. A rotor of the generator 15 is connected to this gas turbine rotor.

Figure 2:
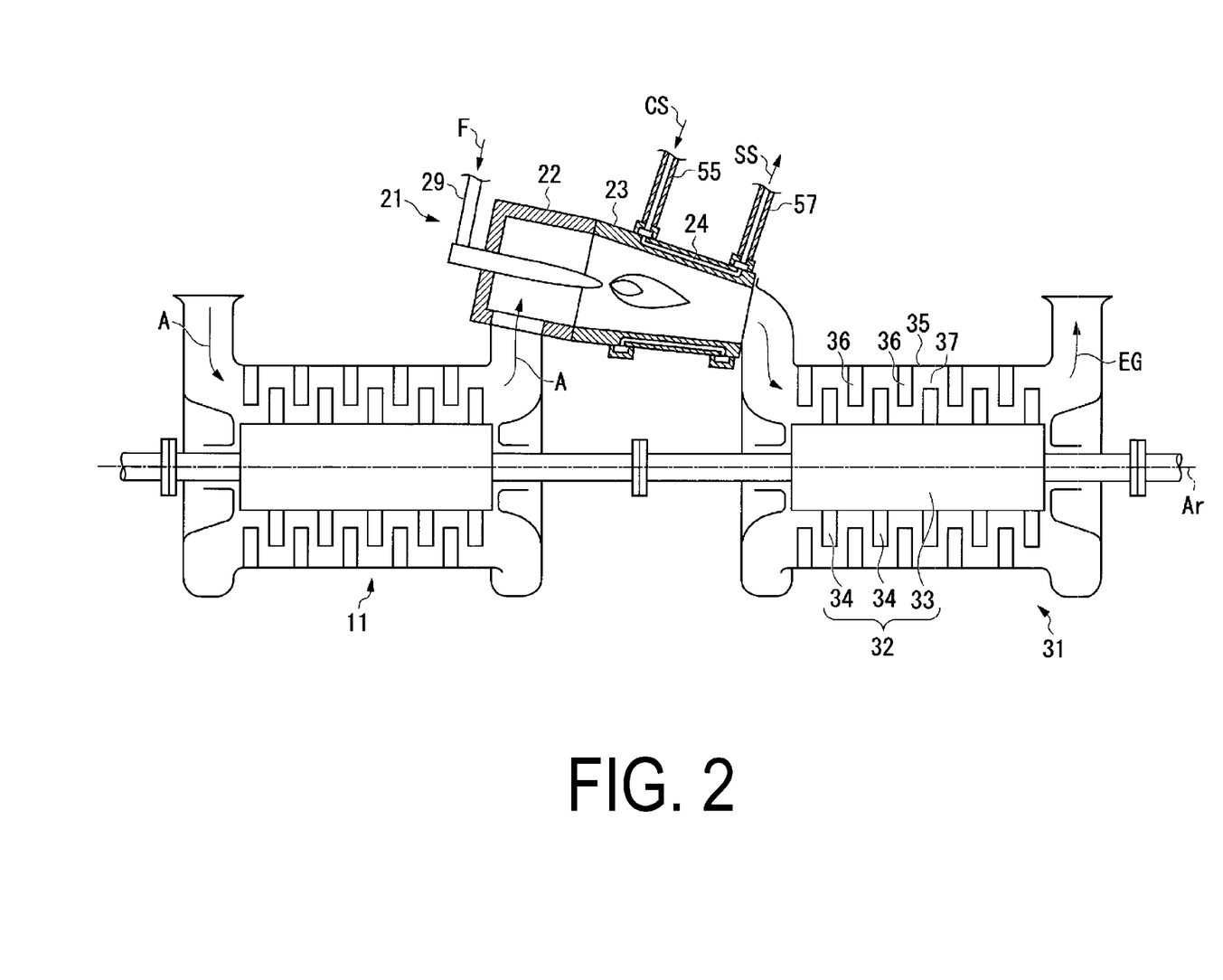
FIG. 2 is a schematic cross-sectional view illustrating the gas turbine of the first embodiment according to the present invention.

The combustor 21, as illustrated in FIG. 2, includes a combustion liner (or transition piece) 23 where the fuel F is combusted in air A from the compressor 11 to generate combustion gas, and an injector 22 that injects the fuel F and the air A from the compressor 11 into the interior of this combustion liner 23. A fuel line 29 that supplies the fuel F from an external fuel supply source to this injector 22 is connected to the injector 22. In addition, a steam flow path 24 through which steam passes is formed on a member that forms the combustion liner 23 in order to cool this member.

The turbine 31 includes a turbine rotor (hereinafter simply referred to a "rotor") 32 that rotates around an axial line Ar by the combustion gas from the combustor 21, and a casing 35 which covers the rotor 32 allowing the rotor 32 to rotate. The rotor 32 includes a rotor main body 33 that extends in an axial direction parallel with the axial line Ar, and a plurality of blades 34 fixed to the outer periphery of the rotor main body 33. In addition, a plurality of vanes 36 is fixed on the inner peripheral surface of the casing 35. A combustion gas flow path 37 through which the combustion gas from the combustor 21 flows is formed between the inner peripheral surface of the casing 35 and the outer peripheral surface of the rotor main body 33. The plurality of combustors 21 is arranged around the axial line Ar side-by-side in the peripheral direction, and fixed to the casing 35 of the turbine 31.

The heat recovery device 100, as illustrated in FIG. 1, includes a heat recovery boiler 110 that generates steam by the heat of the combustion gas that drove the turbine 31, that is, the exhaust gas EG exhausted from the gas turbine 10, steam turbines 121a, 121b, 121c that are driven by the steam generated by the heat recovery boiler 110, a generator 122 that generates power by the driving of the steam turbines 121a, 121b, 121c, a condenser 123 that turns the steam that drove the steam turbine 121a back into water, and a water supply pump 124 that returns the water in the condenser 123 to the heat recovery boiler 110.

The heat recovery device 100 includes the low-pressure steam turbine 121a, the intermediate-pressure steam turbine 121b, and the high-pressure steam turbine 121c as the steam turbines 121a, 121b, 121c. In addition, the heat recovery boiler 110 includes a low-pressure steam generating part 111a that generates low-pressure steam LS, an intermediate-pressure steam generating part 111b that generates intermediate-pressure steam IS, a high-pressure steam generating part 111c that generates high-pressure steam HS, and a reheater 115 that heats the steam that drove the high-pressure steam turbine 121c. The low-pressure steam generating part 111a, the intermediate-pressure steam generating part 111b, and the high-pressure steam generating part 111c all include economizers 112a, 112b, 112c that heat water, evaporators 113a, 113b, 113c that turn the water heated by the economizers 112a, 112b, 112c into steam, and superheaters 114a, 114b, 114c that superheat the steam generated by the evaporators 113a, 113b, 113c. The intermediate-pressure steam generating part 111b and the high-pressure steam generating part 111c further include pumps 116b, 116c that send the water heated by the economizer 112a of the low-pressure steam generating part 111a to their own economizers 112b, 112c, in addition to the economizers 112b, 112c, the evaporators 113b, 113c, and the superheaters 114b, 114c.

In the following, the economizer 112c of the high-pressure steam generating part 111c, the evaporator 113c of the high-pressure steam generating part 111c, and the superheater 114c of the high-pressure steam generating part 111c are respectively referred to as the high-pressure economizer 112c, the high-pressure evaporator 113c, and the high-pressure superheater 114c. In addition, the economizer 112b of the intermediate-pressure steam generating part 111b, the evaporator 113b of the intermediate-pressure steam generating part 111b, and the superheater 114b of the intermediate-pressure steam generating part 111b are respectively referred to as the intermediate-pressure economizer 112b, the intermediate-pressure evaporator 113b, and the intermediate-pressure superheater 114b. In addition, the economizer 112a of the low-pressure steam generating part 111a, the evaporator 113a of the low-pressure steam generating part 111a, and the superheater 114a of the low-pressure steam generating part 111a are respectively referred to as the low-pressure economizer 112a, the low-pressure evaporator 113a, and the low-pressure superheater 114a. In addition, the pump 116b of the intermediate-pressure steam generating part 111b and the pump 116c of the high-pressure steam generating part 111c are respectively referred to as the intermediate-pressure pump 116b and the high-pressure pump 116c.

The reheater 115, the high-pressure superheater 114c, the high-pressure evaporator 113c, the high-pressure economizer 112c, the intermediate-pressure superheater 114b, the intermediate-pressure evaporator 113b, the intermediate-pressure economizer 112b, the low-pressure superheater 114a, the low-pressure evaporator 113a, and the low-pressure economizer 112a are arranged side-by-side in this order toward the downstream side of the exhaust gas EG flowing from the turbine 31 toward the chimney 40.

The condenser 123 and the low-pressure economizer 112a are connected by a water supply line 131. The aforementioned water supply pump 124 is provided on this water supply line 131. The low-pressure superheater 114a and the steam inlet of the low-pressure steam turbine 121a are connected by a low-pressure steam line 132 that sends the low-pressure steam LS from the low-pressure superheater 114a to the low-pressure steam turbine 121a. The steam outlet of the low-pressure steam turbine 121a and the condenser 123 are interconnected so that the low-pressure steam LS that drove the low-pressure steam turbine 121a is supplied to the condenser 123. The high-pressure superheater 114c and the steam inlet of the high-pressure steam turbine 121c are connected by a high-pressure steam line 138 that sends the high-pressure steam HS from the high-pressure superheater 114c to the high-pressure steam turbine 121c. The steam outlet of the high-pressure steam turbine 121c and the steam inlet of the reheater 115 are connected by a high-pressure steam recovery line 139 that sends the high-pressure steam HS from the high-pressure steam turbine 121c to the reheater 115. The steam outlet of the reheater 115 and the steam inlet of the intermediate-pressure steam turbine 121b are connected by a reheat steam line 136 that sends the high-pressure steam HS superheated by the reheater 115 to the intermediate-pressure steam turbine 121b as a reheat steam RHS. An intermediate-pressure steam recovery line 137 is connected to the steam outlet of the intermediate-pressure steam turbine 121b. This intermediate-pressure steam recovery line 137 merges into the low-pressure steam line 132. An intermediate-pressure steam line 133 is connected to the steam outlet of the intermediate-pressure superheater 114b. This intermediate-pressure steam line 133 merges into the high-pressure steam recovery line 139.

The condenser 123 is, for example, a water-cooled condenser that condenses steam by heat exchange between seawater or the like and the steam.

This fuel-preheating device 50 includes a preheater 51 that heats the fuel F supplied to the combustor 21, a cooling-steam line 55 that supplies the steam generated by the heat recovery boiler 110 to the combustor 21 as cooling steam CS, a superheated-steam line 57 that supplies superheated steam SS superheated by passing through the combustor 21 to the preheater 51, a water recovery line 61 that sends the water condensed from the superheated steam SS by the preheater 51 to the water supply line 131 of the heat recovery device 100, and a branch steam line 65 that branches from the superheated-steam line 57.

The preheater 51 is provided in the fuel line 29 that supplies the fuel F to the combustor 21. This preheater 51 is a multitubular heat exchanger and includes a casing 52 and a plurality of tubes 53 provided inside this casing 52. The fuel F that has passed through the fuel line 29 passes through these tubes 53.

The cooling-steam line 55 branches from the high-pressure steam recovery line 139 that sends the high-pressure steam HS from the high-pressure steam turbine 121c to the reheater 115. A cooling-steam regulating valve 56 that regulates the flow rate of the steam supplied from this cooling-steam line 55 to the combustor 21 is provided on this cooling-steam line 55. This cooling-steam line 55 is connected to one end portion of the steam flow path 24 formed in the combustion liner 23 of the combustor 21, as illustrated in FIG. 2. In addition, one end of the superheated-steam line 57 is connected to the other end of the steam flow path 24. The other end of this superheated-steam line 57 is connected to the casing 52 of the preheater 51, as illustrated in FIG. 1. The superheated steam SS that has passed through this superheated-steam line 57 flows to the outside of the tubes 53 of the preheater 51, inside the casing 52 of the preheater 51. A superheated-steam regulating valve 58 that regulates the flow rate of the superheated steam SS that flows into the preheater 51 via this superheated-steam line 57 is provided on this superheated-steam line 57. One end of the water recovery line 61 is connected to the casing 52 of the preheater 51. The other end of this water recovery line 61 is connected to a position on the water supply line 131 of the heat recovery device 100, the position being upstream (on the condenser side) of the position where the water supply pump 124 is provided. The branch steam line 65 branches from the superheated-steam line 57 at a position in the superheated-steam line 57 that is upstream (on the combustor 21 side) of the position where the superheated-steam regulating valve 58 is provided. This branch steam line 65 is connected to the reheat steam line 136 of the heat recovery device 100.

The cooling-steam regulating valve 56 provided on the cooling-steam line 55 and the superheated-steam regulating valve 58 provided on the superheated-steam line 57 both open and close in accordance with instructions from the control device 90.

It should be noted that while the other end of the water recovery line 61 is here connected to the water supply line 131 of the heat recovery device 100, the other end of this water recovery line 61 may be connected to the condenser 123 of the heat recovery device 100. In addition, while the superheated-steam regulating valve 58 that regulates the flow rate of the superheated steam SS is provided on the superheated-steam line 57 here, the superheated-steam regulating valve 58 may be provided on the branch steam line 65.

Next, the operation of the gas turbine plant of this embodiment described above will be described.

The compressor 11 of the gas turbine 10 compresses the air A that is in the atmosphere and supplies the compressed air A to the combustor 21, as illustrated in FIG. 2. In addition, the fuel F from the fuel line 29 is also supplied to the combustor 21. Inside the combustion liner 23 of the combustor 21, the fuel F is combusted in the compressed air A to generate high-temperature, high-pressure combustion gas. This combustion gas is sent from the combustion liner 23 to inside the combustion gas flow path 37 of the turbine 31, and rotates the rotor 32 of this turbine 31. With the rotation of this rotor 32, the generator 15 connected to the gas turbine 10 generates power.

The combustion gas that rotated the rotor 32 of the turbine 31 is exhausted from the gas turbine 10 as the exhaust gas EG, and released to the atmosphere from the chimney 40 via the heat recovery boiler 110. The heat recovery device 100 recovers the heat contained in this exhaust gas EG during a process in which the exhaust gas EG from the gas turbine 10 passes through the heat recovery boiler 110.

In the heat recovery boiler 110, the water from the condenser 123 is supplied to the low-pressure economizer 112a furthest downstream (on the chimney 40 side) via the water supply line 131. The low-pressure economizer 112a heats the water by heat exchange between the water and the exhaust gas EG. A portion of the water heated by the low-pressure economizer 112a is further heated by the low-pressure evaporator 113a and turns into steam. This steam is further superheated by the low-pressure superheater 114a and supplied as the low-pressure steam LS to the low-pressure steam turbine 121a via the low-pressure steam line 132. The steam that drove the low-pressure steam turbine 121a is turned back into water by the condenser 123. This water is supplied from the condenser 123 to the low-pressure economizer 112a once again via the water supply line 131.

Another portion of the water heated by the low-pressure economizer 112a is pressurized by the intermediate-pressure pump 116b and sent to the intermediate-pressure economizer 112b, and the remaining water heated by the low-pressure economizer 112a is pressurized by the high-pressure pump 116c and sent to the high-pressure economizer 112c.

The high-pressure economizer 112c heats the water that has been sent from the high-pressure pump 116c by heat exchange between the water and the exhaust gas EG. The water heated by the high-pressure economizer 112c is further heated by the high-pressure evaporator 113c and turns into steam. This steam is further superheated by the high-pressure superheater 114c and supplied as the high-pressure steam HS to the high-pressure steam turbine 121c via the high-pressure steam line 138.

The intermediate-pressure economizer 112b heats the water that has been sent from the intermediate-pressure pump 116b by heat exchange between the water and the exhaust gas EG. The water heated by the intermediate-pressure economizer 112b is further heated by the intermediate-pressure evaporator 113b and turns into steam. This steam is further superheated by the intermediate-pressure superheater 114b, and a portion thereof is sent to the reheater 115 furthest upstream (on the gas turbine 10 side) in the heat recovery boiler 110 via the intermediate-pressure steam line 133 and the high-pressure steam recovery line 139 as the intermediate-pressure steam IS.

The high-pressure steam HS that drove the high-pressure steam turbine 121c and the intermediate-pressure steam IS from the intermediate-pressure superheater 114b are sent to the reheater 115 furthest upstream (on the gas turbine 10 side) in the heat recovery boiler 110 via the high-pressure steam recovery line 139. The reheater 115 superheats this steam by heat exchange between this steam and the exhaust gas EG, and supplies the steam as the reheat steam RHS to the intermediate-pressure steam turbine 121b via the reheat steam line 136.

The reheat steam RHS that drove the intermediate-pressure steam turbine 121b is supplied to the low-pressure steam turbine 121a via the intermediate-pressure steam recovery line 137 and the low-pressure steam line 132.

A portion of the high-pressure steam HS that drove the high-pressure steam turbine 121c is supplied to the combustor 21 via the high-pressure steam recovery line 139 and the cooling-steam line 55 as the cooling steam CS, as described above. At this time, the flow rate of the cooling steam CS supplied to the combustor 21 is regulated by the cooling-steam regulating valve 56 provided on the cooling-steam line 55.

The cooling steam CS from the cooling-steam line 55 flows into the steam flow path 24 formed in the combustion liner 23 of the combustor 21. The cooling steam CS, during the process of passing through this steam flow path 24, exchanges heat with the combustion liner 23 heated by flame and combustion gas, cooling the combustion liner 23 (cooling steam supplying step). As a result, the cooling steam CS is superheated and turns into the superheated steam SS.

This superheated steam SS flows into the casing 52 of the preheater 51 via the superheated-steam line 57. At this time, the flow rate of the superheated steam SS that flows into the casing 52 of the preheater 51 is regulated by the superheated-steam regulating valve 58 provided on the superheated-steam line 57. The portion of the superheated steam SS from the combustor 21 that does not flow into the casing 52 of the preheater 51, that is, the excess superheated steam SS not used for preheating the fuel F, is supplied to the intermediate-pressure steam turbine 121b via the branch steam line 65 and the reheat steam line 136.

The superheated steam SS that flowed into the casing 52 of the preheater 51 exchanges heat with the fuel F that flows inside the tubes 53 of the preheater 51, heating the fuel F (fuel preheating step). This fuel F is supplied to the injector 22 of the combustor 21 as previously described, via the fuel line 29. Meanwhile, the superheated steam SS is cooled and condensed by heat exchange with the fuel F, and turns into water. This water is returned to the condenser 123 or the water supply line 131 of the heat recovery device 100 via the water recovery line 61.

As described above, according to this embodiment, the fuel F is heated by the superheated steam SS superheated by the cooling of the combustor 21, thereby making it possible to effectively utilize the heat of the combustor 21. Furthermore, according to this embodiment, when the fuel F is heated, the superheated steam SS is condensed, making it possible to thoroughly utilize the heat held by the superheated steam SS. In addition, according to this embodiment, the excess superheated steam SS not used for preheating the fuel F is supplied to the intermediate-pressure steam turbine 121b, making it possible to utilize the excess superheated steam SS as well. Thus, according to this embodiment, it is possible to increase the thermal efficiency of the gas turbine plant overall.

In addition, according to this embodiment, the superheated steam SS is condensed by heat exchange with the fuel F, making it possible to increase the heat exchange rate between the superheated steam SS and the fuel and decrease the size of the preheater 51.

Incidentally, in many cases the gas turbine plant includes an auxiliary boiler that generates steam by a heat source different from the exhaust gas EG from the gas turbine 10 such as, for example, heat separately generated by fuel combustion. In this case, a portion of the steam generated by this auxiliary boiler is introduced into the combustor 21 via the cooling-steam line 55 as the cooling steam CS, thereby making it possible to cool the combustor 21 and preheat the fuel F even in a stage where the heat recovery boiler 110 is not generating steam, for example, in the activation stage of the gas turbine 10. In the preheater 51, the superheated steam SS exchanges heat with the fuel, condenses, and turns into water. This water is sent to the condenser 123 or the water supply line 131 via the water recovery line 61. Thus, according to this embodiment, even in a case where the heat recovery boiler 110 is not operating steadily and steam from an auxiliary boiler is used, this steam is condensed by heat exchange with the fuel F, making it possible to very effectively utilize the heat of this steam.

Second Embodiment

Figure 3:
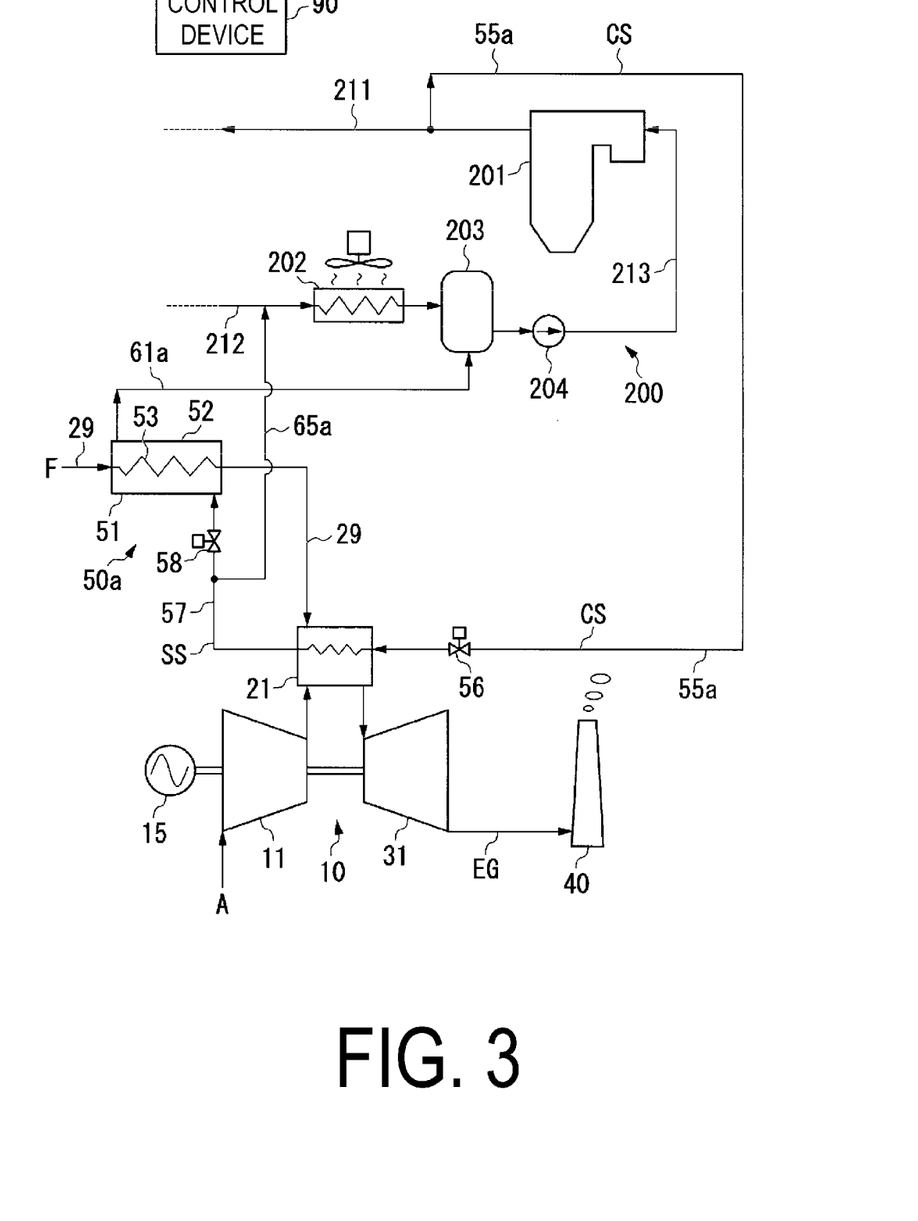
FIG. 3 is a system diagram illustrating a gas turbine plant of a second embodiment according to the present invention.

Next, a second embodiment of a gas turbine plant according to the present invention will be described with reference to FIG. 3.

The gas turbine plant of this embodiment includes the gas turbine 10, the generator 15 that generates power by the driving of the gas turbine 10, the chimney 40 that releases the exhaust gas EG exhausted from the gas turbine 10 into the atmosphere, an auxiliary steam generating device 200 that generates steam, a fuel-preheating device 50a that preheats the fuel F supplied to the combustor 21, and the control device 90 that controls the gas turbine 10, the fuel-preheating device 50a, and the like.

That is, the gas turbine plant of this embodiment includes the auxiliary steam generating device 200 in place of the heat recovery device 100 of the gas turbine plant of the first embodiment. This auxiliary steam generating device 200 includes an auxiliary boiler 201, a condenser 202 that turns the steam generated by this auxiliary boiler 201 back into water, a degassing tank 203 that removes dissolved gasses in the water from the condenser 202, and a water supply pump 204 that supplies the water of the degassing tank 203 to the auxiliary boiler 201. The auxiliary boiler 201 is a boiler that generates steam by a heat source different from the exhaust gas EG from the gas turbine 10, for example, heat separately generated by fuel combustion.

An auxiliary steam line 211 that supplies the steam generated in the auxiliary boiler 201 to various equipment and the like is connected to the auxiliary boiler 201. A steam recovery line 212 that sends the steam utilized by various equipment and the like to the condenser 202 is connected to the condenser 202. This condenser 202 is, for example, an air-cooled condenser that cools the steam by air. The condenser 202 and the auxiliary boiler 201 are connected by a water supply line 213. The aforementioned degassing tank 203 and the water supply pump 204 downstream therefrom are provided on this water supply line 213.

The fuel-preheating device 50a of this embodiment, similarly to the fuel-preheating device 50 of the first embodiment, includes the preheater 51 that heats fuel supplied to the combustor 21, a cooling-steam line 55a that supplies the steam generated by the auxiliary boiler 201 to the combustor 21 as the cooling steam CS, the superheated-steam line 57 that supplies the superheated steam SS superheated by passing through the combustor 21 to the preheater 51, a water recovery line 61a that sends the water condensed from the superheated steam SS by the preheater 51 to the degassing tank 203 of the auxiliary steam generating device 200, and a branch steam line 65a that branches from the superheated-steam line 57.

The preheater 51, similarly to the preheater 51 of the first embodiment, is provided on the fuel line 29 that supplies the fuel F to the combustor 21. The cooling-steam line 55a branches from the auxiliary steam line 211 of the auxiliary steam generating device 200. The cooling-steam regulating valve 56 that regulates the flow rate of the steam supplied from this cooling-steam line 55a to the combustor 21 is provided on this cooling-steam line 55a. This cooling-steam line 55a, similarly to the first embodiment, is connected to one end portion of the steam flow path 24 formed in the combustion liner 23 of the combustor 21. In addition, one end of the superheated-steam line 57 is connected to an end portion of the steam flow path 24 formed in this combustion liner 23. The other end of this superheated-steam line 57 is connected to the casing 52 of the preheater 51. The superheated-steam regulating valve 58 that regulates the flow rate of the superheated steam SS that flows into the preheater 51 is provided on this superheated-steam line 57. One end of this water recovery line 61a is connected to the casing 52 of the preheater 51. The other end of this water recovery line 61a is connected to the degassing tank 203 of the auxiliary steam generating device 200. The branch steam line 65a branches from the superheated-steam line 57 at a position in the superheated-steam line 57 upstream (on the combustor 21 side) of the position where the superheated-steam regulating valve 58 is provided. This branch steam line 65a is connected to the steam recovery line 212 of the auxiliary steam generating device 200.

The cooling-steam regulating valve 56 provided on the cooling-steam line 55a and the superheated-steam regulating valve 58 provided on the superheated-steam line 57 both open and close in accordance with instructions from the control device 90, similarly to the first embodiment.

It should be noted that while the other end of the water recovery line 61a is connected to the degassing tank 203 of the auxiliary steam generating device 200 here, it may be connected to the condenser 202 of the auxiliary steam generating device 200.

Next, the operation of the gas turbine plant of this embodiment described above will be described.

In this embodiment as well, the gas turbine 10 operates in the same manner as in the first embodiment.

A portion of the steam generated by the auxiliary boiler 201 of the auxiliary steam generating device 200 is sent as the cooling steam CS to the combustor 21 via the auxiliary steam line 211 and the cooling-steam line 55a. At this time, the flow rate of the cooling steam CS supplied to the combustor 21 is regulated by the cooling-steam regulating valve 56 provided on the cooling-steam line 55a.

The cooling steam CS from the cooling-steam line 55a, similarly to the first embodiment, flows into the steam flow path 24 formed in the combustion liner 23 of the combustor 21. The cooling steam CS, during the process of passing through this steam flow path 24, exchanges heat with the combustion liner 23 heated by flame and combustion gas, cooling the combustion liner 23. As a result, the cooling steam CS is superheated and turns into the superheated steam SS.

This superheated steam SS, similarly to the first embodiment, flows into the casing 52 of the preheater 51 via the superheated-steam line 57. At this time, the flow rate of the superheated steam SS that flows into the casing 52 of the preheater 51 is regulated by the superheated-steam regulating valve 58 provided on the superheated-steam line 57. The portion of the superheated steam SS from the combustor 21 that does not flow into the casing 52 of the preheater 51 is supplied to the condenser 202 of the auxiliary steam generating device 200 via the branch steam line 65a and the steam recovery line 212 of the auxiliary steam generating device 200.

The superheated steam SS that flowed into the casing 52 of the preheater 51 exchanges heat with the fuel F that flows inside the tubes 53 of the preheater 51, heating the fuel F. This fuel F is supplied to the combustor 21 via the fuel line 29. Meanwhile, the superheated steam SS is cooled and condensed by heat exchange with the fuel F, and turns into water. This water is returned to the condenser 202 or the degassing tank 203 of the auxiliary steam generating device 200 via the water recovery line 61a.

As described above, according to this embodiment, as with the first embodiment, the fuel F is heated by the superheated steam SS superheated by the cooling of the combustor 21, thereby making it possible to effectively utilize the heat of the combustor 21. Furthermore, according to this embodiment as well, when the fuel F is heated, the superheated steam SS is condensed, making it possible to thoroughly utilize the heat held by the superheated steam SS. Thus, according to this embodiment as well, it is possible to increase the thermal efficiency of the gas turbine plant overall.

Third Embodiment

Figure 4:
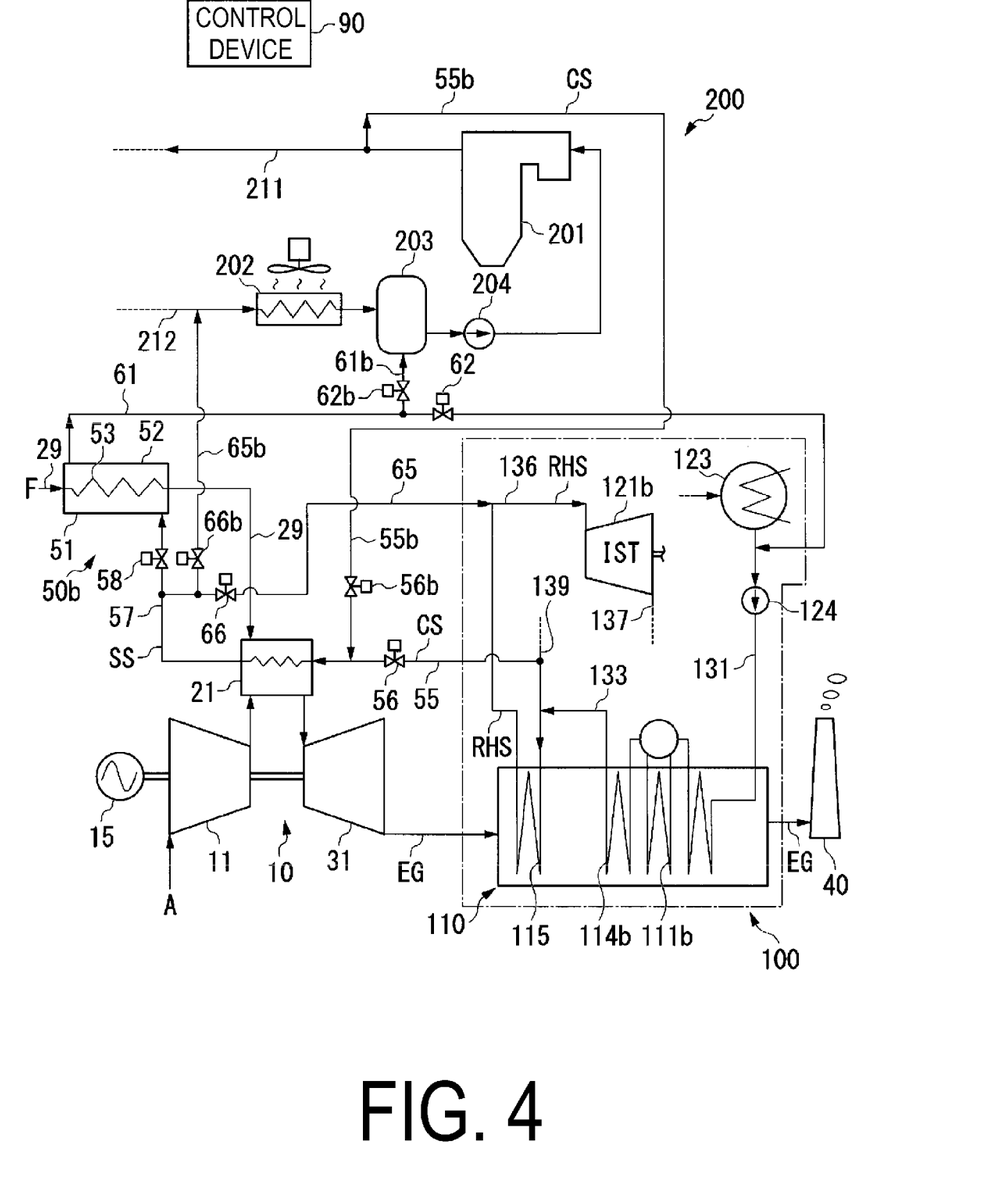
FIG. 4 is a system diagram illustrating a gas turbine plant of a third embodiment according to the present invention.

Next, a third embodiment of a gas turbine plant according to the present invention will be described with reference to FIG. 4.

The gas turbine plant of this embodiment includes the gas turbine 10, the generator 15 that generates power by the driving of the gas turbine 10, the heat recovery device 100 that generates steam by the heat of the exhaust gas EG exhausted from the gas turbine 10, the chimney 40 that releases the exhaust gas EG that has passed through the heat recovery device 100 into the atmosphere, the auxiliary steam generating device 200 that generates steam, a fuel-preheating device 50b that preheats the fuel supplied to the gas turbine 10, and the control device 90 that controls the gas turbine 10, the fuel-preheating device 50b, and the like.

That is, the gas turbine plant of this embodiment has the auxiliary steam generating device 200 of the second embodiment added to the gas turbine plant of the first embodiment.

The fuel-preheating device 50b of this embodiment, similarly to the first embodiment, includes the preheater 51 that heats fuel supplied to the combustor 21, the cooling-steam line 55 that supplies the steam generated by the heat recovery boiler 110 to the combustor 21 as the cooling steam CS, the superheated-steam line 57 that supplies the superheated steam SS superheated by passing through the combustor 21 to the preheater 51, the water recovery line 61 that sends the water condensed from the superheated steam SS by the preheater 51 to the water supply line 131 of the heat recovery device 100, and the branch steam line 65 that branches from the superheated-steam line 57. Furthermore, the fuel-preheating device 50b of this embodiment further includes an auxiliary cooling-steam line 55b that supplies the steam generated by the auxiliary boiler 201 to the combustor 21 as the cooling steam CS, an auxiliary water recovery line 61b that branches from the water recovery line 61, and an auxiliary branch steam line 65b that branches from the branch steam line 65.

The auxiliary cooling-steam line 55b branches from the auxiliary steam line 211 of the auxiliary steam generating device 200, and merges into the cooling-steam line 55. An auxiliary cooling-steam regulating valve 56b that regulates the flow rate of the steam supplied from this auxiliary cooling-steam line 55b to the combustor 21 via the cooling-steam line 55 is provided on this auxiliary cooling-steam line 55b. The auxiliary water recovery line 61b branches from the water recovery line 61 and is connected to the degassing tank 203 of the auxiliary steam generating device 200. An auxiliary recovered water regulating valve 62b that regulates the flow rate of the water that flows into the degassing tank 203 is provided on this auxiliary water recovery line 61b. In addition, a recovered water regulating valve 62 is provided on the water recovery line 61 at a position that is on the condenser 123 side of the heat recovery device 100 of the position where the auxiliary water recovery line 61b branches. The auxiliary branch steam line 65b branches from the branch steam line 65 and is connected to the steam recovery line 212 of the auxiliary steam generating device 200. An auxiliary recovered steam regulating valve 66b that regulates the flow rate of the steam that flows through the auxiliary branch steam line 65b is provided on this auxiliary branch steam line 65b. In addition, a recovered steam regulating valve 66 that regulates the flow rate of the steam that flows through the branch steam line 65 is provided on the branch steam line 65 at a position on the intermediate-pressure steam turbine 121b side of the heat recovery device 100 of the position where the auxiliary branch steam line 65b branches.

Each of the regulating valves 56, 56b, 58, 62, 62b, 66, 66b of the fuel-preheating device 50b of this embodiment opens and closes in accordance with instructions from the control device 90.

Next, the operation of the gas turbine plant of this embodiment described above will be described.

In this embodiment as well, the gas turbine 10 and the heat recovery device 100 operate in the same manner as in the first embodiment.

In addition, in this embodiment, when the gas turbine 10 and the heat recovery device 100 are operating steadily, the fuel-preheating device 50b operates in the same manner as in the first embodiment. That is, the fuel-preheating device 50b of this embodiment operates as follows.

A portion of the high-pressure steam HS that drove the high-pressure steam turbine 121c is supplied to the combustor 21 via the high-pressure steam recovery line 139 and the cooling-steam line 55 as the cooling steam CS, and a portion of the steam from the intermediate-pressure superheater 114b of the heat recovery device 100 is supplied to the combustor 21 via the intermediate-pressure steam line 133 and the cooling-steam line 55 as the cooling steam CS. At this time, the flow rate of the cooling steam CS supplied to the combustor 21 is regulated by the cooling-steam regulating valve 56 provided on the cooling-steam line 55. In addition, at this time, the auxiliary cooling-steam regulating valve 56b is fully closed.

The cooling steam CS from the cooling-steam line 55 cools the combustion liner 23 of the combustor 21 by heat exchange with this combustion liner 23. Meanwhile, this cooling steam CS is superheated and turns into the superheated steam SS.

This superheated steam SS flows into the casing 52 of the preheater 51 via the superheated-steam line 57. At this time, the flow rate of the superheated steam SS that flows into the casing 52 of the preheater 51 is regulated by the superheated-steam regulating valve 58 provided on the superheated-steam line 57. The portion of the superheated steam SS from the combustor 21 that does not flow into the casing 52 of the preheater 51 is supplied to the intermediate-pressure steam turbine 121b via the branch steam line 65 and the reheat steam line 136. In addition, at this time, the recovered steam regulating valve 66 is fully open, and the auxiliary recovered steam regulating valve 66b is fully closed.

The superheated steam SS that flowed into the casing 52 of the preheater 51 exchanges heat with the fuel F that flows inside the tubes 53 of the preheater 51, heating the fuel F. This fuel F is supplied to the combustor 21 via the fuel line 29. Meanwhile, the superheated steam SS is cooled and condensed by heat exchange with the fuel F, and turns into water. This water is returned to the condenser 123 or the water supply line 131 of the heat recovery device 100 via the water recovery line 61. At this time, the recovered water regulating valve 62 is fully open, and the auxiliary recovered water regulating valve 62b is fully closed.

In addition, in this embodiment, when the gas turbine 10 is in an activation stage or the like and the heat recovery device 100 is not operating steadily, the fuel-preheating device 50b operates in the same manner as in the second embodiment. That is, the fuel-preheating device 50b of this embodiment operates as follows.

A portion of the steam generated by the auxiliary boiler 201 of the auxiliary steam generating device 200 is, as the cooling steam CS, sent to the combustor 21 via the auxiliary steam line 211, the auxiliary cooling-steam line 55b, as well as the cooling-steam line 55. At this time, the flow rate of the cooling steam CS supplied to the combustor 21 is regulated by the auxiliary cooling-steam regulating valve 56b. In addition, at this time, the cooling-steam regulating valve 56 is fully closed.

The cooling steam CS from the auxiliary steam line 211, the auxiliary cooling-steam line 55b, as well as the cooling-steam line 55 exchanges heat with the combustion liner 23 of the combustor 21, and cools the combustion liner 23. Meanwhile, this cooling steam CS is superheated and turns into the superheated steam SS.

This superheated steam SS flows into the casing 52 of the preheater 51 via the superheated-steam line 57. At this time, the flow rate of the superheated steam SS that flows into the casing 52 of the preheater 51 is regulated by the superheated-steam regulating valve 58 provided on the superheated-steam line 57. The portion of the superheated steam SS from the combustor 21 that does not flow into the casing 52 of the preheater 51 is supplied to the condenser 202 of the auxiliary steam generating device 200 via the branch steam line 65, the auxiliary branch steam line 65b, as well as the steam recovery line 212 of the auxiliary steam generating device 200. At this time, the auxiliary recovered steam regulating valve 66b is fully open, and the recovered steam regulating valve 66 is fully closed.

The superheated steam SS that flowed into the casing 52 of the preheater 51 exchanges heat with the fuel F that flows inside the tubes 53 of the preheater 51, heating the fuel F. This fuel F is supplied to the combustor 21 via the fuel line 29. Meanwhile, the superheated steam SS is cooled and condensed by heat exchange with the fuel F, and turns into water. This water is returned to the condenser 202 or the degassing tank 203 of the auxiliary steam generating device 200 via the water recovery line 61 and the auxiliary water recovery line 61b. At this time, the auxiliary recovered water regulating valve 62b is fully open, and the recovered water regulating valve 62 is fully closed.

Thus, according to this embodiment, it is possible to use the steam from the heat recovery device 100 to cool the combustor 21 and preheat the fuel F when the gas turbine 10 and the heat recovery device 100 are operating steadily, and use the steam from the auxiliary steam generating device 200 to cool the combustor 21 and preheat the fuel F when the gas turbine 10 is in an activation stage or the like and the heat recovery device 100 is not operating steadily. Moreover, according to this embodiment, it is possible to increase the thermal efficiency of the gas turbine plant overall when the gas turbine 10 and the heat recovery device 100 are operating steadily as well as when the gas turbine 10 is in an activation stage or the like and the heat recovery device 100 is not operating steadily.

First Modification of Fuel-Preheating Device

Figure 5:
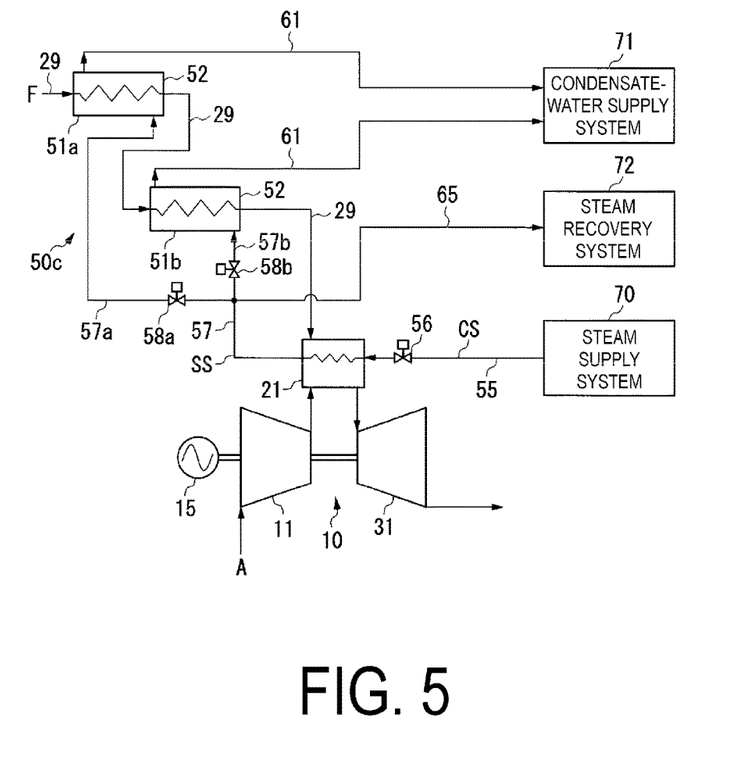
FIG. 5 is a system diagram illustrating a fuel-preheating device of a first modification according to the present invention.

Next, a first modification of the fuel-preheating device of each of the above embodiments will be described with reference to FIG. 5.

A fuel-preheating device 50c of this modification includes two preheaters 51a, 51b, the cooling-steam line 55, the superheated-steam line 57, the water recovery line 61, and the branch steam line 65 that branches from the superheated-steam line 57. That is, the fuel-preheating device 50c of this modification is basically the same as the fuel-preheating device of the above embodiments, except that it includes the two preheaters 51a, 51b. The two preheaters 51a, 51b are provided in series on the fuel line 29. Of these two preheaters 51a, 51b, the preheater 51a provided upstream of the fuel line 29 forms the first preheater 51a, and the preheater 51b provided downstream of the fuel line 29 forms the second preheater 51b.

The cooling-steam line 55 of this modification branches from a steam supply system 70. This steam supply system 70 is the intermediate-pressure steam line 133 of the heat recovery device 100 in the first and third embodiments, or the auxiliary steam line 211 of the auxiliary steam generating device 200 of the second and third embodiments. This cooling-steam line 55, similarly to each of the above embodiments, is connected to the combustion liner 23 of the combustor 21. In addition, the cooling-steam regulating valve 56 is provided on this cooling-steam line 55.

The superheated-steam line 57 connected to the combustion liner 23 of the combustor 21 branches into two lines midway, with one line forming a first superheated-steam line 57a that is connected to the casing 52 of the first preheater 51a, and the other line forming a second superheated-steam line 57b that is connected to the casing 52 of the second preheater 51b. A first superheated-steam regulating valve 58a that regulates the flow rate of the superheated steam SS that flows through the first superheated-steam line 57a is provided on the first superheated-steam line 57a, and a second superheated-steam regulating valve 58b that regulates the flow rate of the superheated steam SS that flows through the second superheated-steam line 57b is provided on the second superheated-steam line 57b.

The water recovery line 61 is connected to the casing 52 of the first preheater 51a and the casing 52 of the second preheater 51b, respectively. Both of the water recovery lines 61 are connected to a condensate/water supply system 71. This condensate/water supply system 71 is the condenser 123 or the water supply line 131 of the heat recovery device 100 in the first and third embodiments, or the condenser 202 or the degassing tank 203 of the auxiliary steam generating device 200 in the second and third embodiments.

The branch steam line 65 that branches from the superheated-steam line 57 is connected to a steam recovery system 72. This steam recovery system 72 is the reheat steam line 136 of the heat recovery device 100 in the first and third embodiments, or the steam recovery line 212 of the auxiliary steam generating device 200 in the second and third embodiments.

In this embodiment as well, the steam from the steam supply system 70 is sent as the cooling steam CS to the combustor 21 via the cooling-steam line 55. The cooling steam CS from the cooling-steam line 55 cools the combustion liner 23 of the combustor 21 by heat exchange with this combustion liner 23. Meanwhile, this cooling steam CS is superheated and turns into the superheated steam SS.

This superheated steam SS flows into the casing 52 of the first preheater 51a via the first superheated-steam line 57a, and flows into the casing 52 of the second preheater 51b via the second superheated-steam line 57b. At this time, the flow rate of the superheated steam SS that flows into the casing 52 of the first preheater 51a is regulated by the first superheated-steam regulating valve 58a, and the flow rate of the superheated steam SS that flows into the casing 52 of the second preheater 51b is regulated by the second superheated-steam regulating valve 58b. The portion of the superheated steam SS from the combustor 21 that does not flow into the casing 52 of the first preheater 51a or the casing 52 of the second preheater 51b is supplied to the steam recovery system 72 via the branch steam line 65.

The superheated steam SS that flowed into the casing 52 of the first preheater 51a heats the fuel F. This fuel F is sent to the second preheater 51b via the fuel line 29. In addition, the superheated steam SS that flowed into the casing 52 of the second preheater 51b further heats the fuel F heated by the first preheater 51a. This fuel F is supplied to the combustor 21 via the fuel line 29. Meanwhile, the superheated steam SS is cooled and condensed by heat exchange with the fuel F in each of the preheaters 51a, 51b, and turns into water. This water is supplied to the condensate/water supply system 71 via the water recovery line 61.

Thus, according to this modification, the fuel F is heated in two stages, making it possible to supply the fuel F at a higher temperature than in the above embodiments, thereby increasing the combustion efficiency of the fuel F in the combustor 21.

Second Modification of Fuel-Preheating Device

Figure 6:
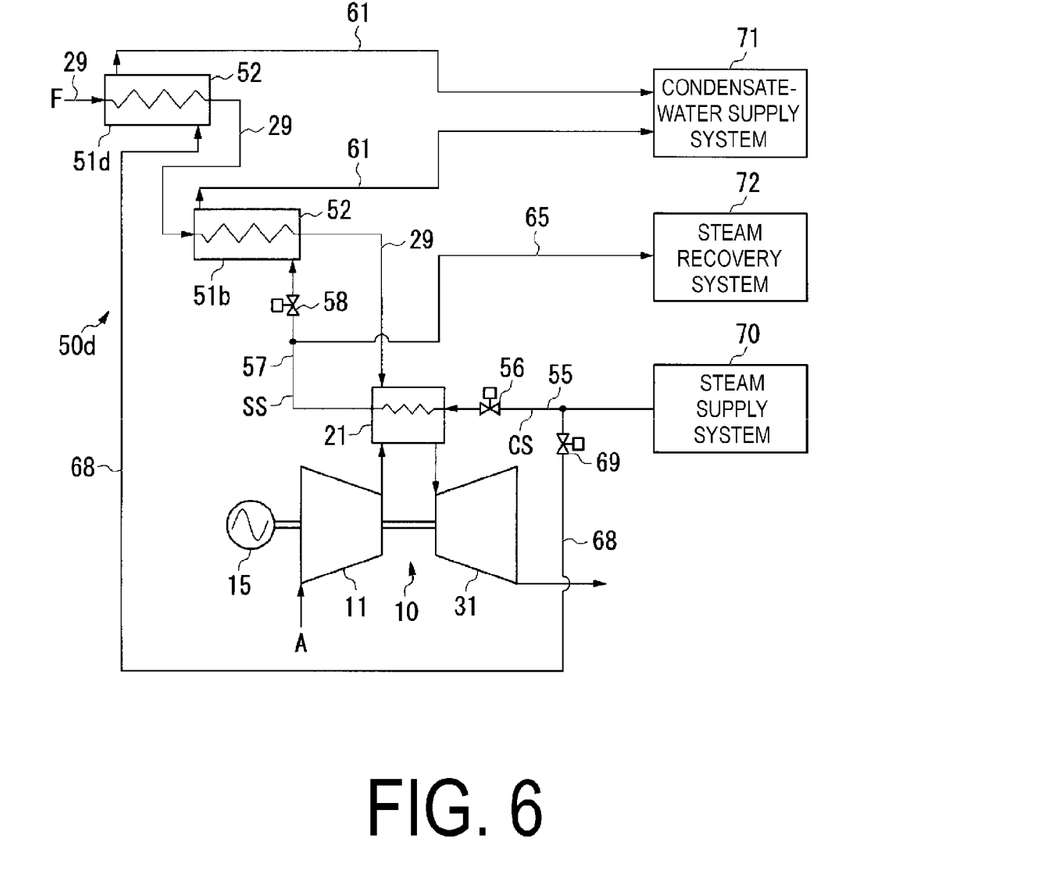
FIG. 6 is a system diagram illustrating a fuel-preheating device of a second modification according to the present invention.

Next, a second modification of the fuel-preheating device of each of the above embodiments will be described with reference to FIG. 6.

A fuel-preheating device 50d of this modification, similarly to the first modification, also includes two preheaters 51d, 51b, the cooling-steam line 55, the superheated-steam line 57, the water recovery line 61, and the branch steam line 65 that branches from the superheated-steam line 57. Furthermore, in this modification as well, similarly to the first modification, the two preheaters 51d, 51b are provided in series in the fuel line 29. Of these two preheaters 51d, 51b, the preheater 51d provided upstream of the fuel line 29 forms the first preheater (first-stage preheater) 51d, and the preheater 51b provided downstream of the fuel line 29 forms the second preheater (second-stage preheater) 51b.

The cooling-steam line 55 of this modification, similarly to the first modification, also branches from the steam supply system 70 and is connected to the combustion liner 23 of the combustor 21. In addition, the cooling-steam regulating valve 56 is also provided on this cooling-steam line 55. This cooling-steam line 55 branches at a position on the steam supply system 70 side of the position of the cooling-steam regulating valve 56, and this branched line forms a first preheater steam line (first-stage steam line) 68. This first preheater steam line 68 is connected to the casing 52 of the first preheater 51d. A first preheater steam regulating valve 69 is provided on this first preheater steam line 68.

The superheated-steam line 57 connected to the combustion liner 23 of the combustor 21 is connected to the casing 52 of the second preheater 51b. The superheated-steam regulating valve 58 that regulates the flow rate of the superheated steam SS that flows through the superheated-steam line 57 is provided on this superheated-steam line 57 as well.

The water recovery line 61 is connected to the casing 52 of the first preheater 51d and the casing 52 of the second preheater 51b, respectively, similarly to the first modification. Both of the water recovery lines 61 are connected to the condensate/water supply system 71. In addition, the branch steam line 65 that branches from the superheated-steam line 57, similarly to the first modification, is also connected to the steam recovery system 72.

According to this modification, a portion of the steam from the steam supply system 70 flows into the casing 52 of the first preheater 51d via the first preheater steam line 68. At this time, the flow rate of the steam that flows into the casing 52 of the first preheater 51d is regulated by the first preheater steam regulating valve 69. The steam that flowed into the casing 52 of the first preheater 51d heats the fuel F. This fuel F is supplied to the second preheater 51b via the fuel line 29. Meanwhile, the steam is cooled and condensed by heat exchange with the fuel F in the first preheater 51d, and turns into water. This water is supplied to the condensate/water supply system 71 via the water recovery line 61.

In addition, in this modification, the remaining portion of steam from the steam supply system 70 is sent as the cooling steam CS to the combustor 21 via the cooling-steam line 55. The cooling steam CS from the cooling-steam line 55 cools the combustion liner 23 of the combustor 21 by heat exchange with this combustion liner 23. Meanwhile, this cooling steam CS is superheated and turns into the superheated steam SS.

This superheated steam SS flows into the casing 52 of the second preheater 51b via the superheated-steam line 57. At this time, the flow rate of the superheated steam SS that flows into the casing 52 of the second preheater 51b is regulated by the superheated-steam regulating valve 58. The portion of the superheated steam SS from the combustor 21 that does not flow into the casing 52 of the second preheater 51b is supplied to the steam recovery system 72 via the branch steam line 65.

The superheated steam SS that flowed into the casing 52 of the second preheater 51b further heats the fuel F heated by the first preheater 51d. This fuel F is supplied to the combustor 21 via the fuel line 29. Meanwhile, the superheated steam SS is cooled and condensed by heat exchange with the fuel F in the second preheater 51b, and turns into water. This water is supplied to the condensate/water supply system 71 via the water recovery line 61.

Thus, according to this modification as well, similarly to the first modification, the fuel F is heated in two stages, making it possible to supply the fuel F to the combustor 21 at a higher temperature than in the above embodiments, thereby increasing the combustion efficiency of the fuel F in the combustor 21.

It should be noted that, according to the first modification, the cooling steam CS superheated by passing through the combustion liner 23 of the combustor 21 is supplied as the superheated steam SS to the interior of the casing 52 of the first preheater 51a and the interior of the casing 52 of the second preheater 51b, and therefore the flow rate of the cooling steam CS supplied to the combustion liner 23 of the combustor 21 is higher than in each of the above embodiments. Thus, the fuel-preheating device 50c of the first modification is effective in a case where a high flow rate is required to cool the combustion liner 23.

On the other hand, according to the second modification, the cooling steam CS superheated by passing through the combustion liner 23 of the combustor 21 is supplied as the superheated steam SS to only the interior of the casing 52 of the second preheater 51b, and therefore the flow rate of the cooling steam CS supplied to the combustion liner 23 of the combustor 21 is the same as in the above embodiments. Nevertheless, according to the second modification as well, the fuel F is heated in two stages as described above, making it possible to supply the fuel F at a higher temperature than in the above embodiments to the combustor 21. Thus, the fuel-preheating device 50d of the second modification is effective in a case where the flow rate of the steam for cooling the combustion liner 23 is preferably suppressed while supplying the fuel F at a high temperature to the combustor 21.

Other Modifications

While each of the above embodiments and modifications is an example in which the combustion liner 23 of the combustor 21 is cooled by steam, the hot part of either the combustor 21 or the turbine 31 that contacts the combustion gas may be cooled by steam, and the fuel may be preheated using the steam that cooled the hot part. It should be noted that examples of the hot part include the vane 36 or the blade 34 (illustrated in FIG. 2) of the turbine 31, a ring segment of the inner peripheral surface of the casing 35 of the turbine 31 that constitutes the section facing the blade 34, and the like.

INDUSTRIAL APPLICABILITY

According to an aspect of the present invention, it is possible to increase the thermal efficiency of the gas turbine plant overall.

REFERENCE SIGNS LIST

10 Gas turbine
11 Compressor
21 Combustor
22 Injector
23 Combustion liner
24 Steam flow path
31 Turbine
32 Turbine rotor (or simply rotor)
34 Blade
35 Casing
36 Vane
40 Chimney
50, 50a, 50b, 50c, 50d Fuel-preheating device
51 Preheater
51a First preheater
51b Second preheater
51d First preheater (first-stage preheater)
55, 55a Cooling-steam line
55b Auxiliary cooling-steam line
56 Cooling-steam regulating valve
56b Auxiliary cooling-steam regulating valve
57 Superheated-steam line
57a First superheated-steam line
57b Second superheated-steam line
58 Superheated-steam regulating valve
58a First superheated-steam regulating valve
58b Second superheated-steam regulating valve
61, 61a Water recovery line
61b Auxiliary water recovery line
65, 65a Branch steam line
65b Auxiliary branch steam line
100 Heat recovery device
110 Heat recovery boiler
111a Low-pressure steam generating part
111b Intermediate-pressure steam generating part
111c High-pressure steam generating part
121a Low-pressure steam turbine
121b Intermediate-pressure steam turbine
121c High-pressure steam turbine
123 Condenser
131 Water supply line
133 Intermediate-pressure steam line
136 Reheat steam line
200 Auxiliary steam generating device
201 Auxiliary boiler
202 Condenser
203 Degassing tank
211 Auxiliary steam line
212 Steam recovery line
213 Water supply line

The invention claimed is:

1. A preheating device for gas turbine fuel comprising:
a cooling-steam line that is configured to supply steam, for the purpose of cooling, to a hot part of either a combustor that is configured to combust fuel to generate combustion gas or a turbine that is configured to be driven by the combustion gas, the hot part being a part that contacts the combustion gas;
a superheated-steam line that is configured to allow superheated steam to flow therethrough, the superheated steam being the steam that has passed through the hot part; and
a preheater that is configured to preheat the fuel by exchanging heat between the superheated steam supplied from the superheated-steam line and the fuel supplied to the combustor, wherein
the preheater is configured to condense the superheated steam into a liquid by heat exchange between the superheated steam and the fuel.

2. The preheating device for gas turbine fuel according to claim 1, further comprising:
one or more additional preheaters that are configured to preheat the fuel by exchanging heat between the superheated steam supplied from the superheated-steam line and the fuel supplied to the combustor; and
a fuel line that connects in series the preheater and the one or more additional preheaters so that the fuel sequentially flows into the preheater and the one or more additional preheaters;
wherein the superheated-steam line is configured to supply the superheated steam to each of the preheater and the one or more additional preheaters.

3. The preheating device for gas turbine fuel according to claim 1, further comprising:
a first-stage steam line that is configured to allow steam that does not pass through the hot part to flow therethrough;
a first-stage preheater that is configured to preheat the fuel by heat exchange between the steam supplied from the first-stage steam line and the fuel supplied to the combustor; and
a fuel line that connects the first-stage preheater and a second-stage preheater, the second-stage preheater being the preheater, so that the fuel preheated by the first-stage preheater is supplied to the second-stage preheater.

4. The preheating device for gas turbine fuel according to claim 1, further comprising:
a branch steam line that branches from the superheated-steam line and is configured to discharge a portion of the superheated steam that flows through the superheated-steam line;
a cooling-steam regulating valve that is configured to regulate a flow rate of the steam supplied to the hot part via the cooling-steam line; and
a superheated-steam regulating valve that is configured to regulate a flow rate of the superheated steam supplied to the preheater via the superheated-steam line.

5. A gas turbine plant comprising:
the preheating device for gas turbine fuel according to claim 4;
a gas turbine that includes the combustor and the turbine;
a heat recovery boiler that is configured to generate steam by heat of exhaust gas from the turbine;
a steam turbine that is configured to be driven by the steam generated by the heat recovery boiler;
a condenser that is configured to turn the steam that drove the steam turbine back into water;
a water supply line that is configured to supply water generated by the condenser to the heat recovery boiler; and
a water recovery line that is configured to send water condensed from the superheated steam by heat exchange between the superheated steam and the fuel in the preheater to the condenser or the water supply line, wherein
the heat recovery boiler includes a steam generating part that is configured to generate steam by the heat of the exhaust gas, and a reheating part that is configured to superheat steam generated by the steam generating part and send the superheated steam to the steam turbine,
the cooling-steam line is configured to supply steam generated by the steam generating part, before being superheated by the reheating part, to the hot part, and
the branch steam line is configured to introduce the superheated steam into the steam turbine.

6. A gas turbine plant comprising:
the preheating device for gas turbine fuel according to claim 4;
a gas turbine that includes the combustor and the turbine;
an auxiliary boiler that is configured to generate steam by a heat source different from exhaust gas from the turbine;
a condenser that is configured to turn the steam generated by the auxiliary boiler back into water;
a water supply line that is configured to supply water generated by the condenser to the auxiliary boiler; and
a water recovery line that is configured to send water condensed from the superheated steam by heat exchange between the superheated steam and the fuel in the preheater to the condenser or the water supply line, wherein
the cooling-steam line is configured to supply steam generated by the auxiliary boiler to the hot part, and
the branch steam line is configured to introduce the superheated steam into the condenser.

7. A gas turbine plant comprising:
the preheating device for gas turbine fuel according to claim 1;
a gas turbine that includes the combustor and the turbine;
a steam generating source that is configured to generate steam;
a condenser that is configured to turn steam generated by the steam generating source back into water;
a water supply line that is configured to supply water generated by the condenser to the steam generating source; and
a water recovery line that is configured to send water condensed from the superheated steam by heat exchange between the superheated steam and the fuel in the preheater to the condenser or the water supply line, wherein
the cooling-steam line is configured to supply steam generated by the steam generating source to the hot part.

8. The gas turbine plant according to claim 7, wherein
the steam generating source includes a heat recovery boiler that is configured to generate steam by heat of exhaust gas from the turbine.

9. The gas turbine plant according to claim 7, wherein
the steam generating source includes an auxiliary boiler that is configured to generate steam by a heat source different from exhaust gas from the turbine.

10. A preheating method for gas turbine fuel comprising:
a cooling steam supplying step for supplying steam, for the purpose of cooling, to a hot part of either a combustor that combusts fuel to generate combustion gas or a turbine that is driven by the combustion gas, the hot part being a part that contacts the combustion gas; and
a fuel preheating step for preheating the fuel by exchanging heat between superheated steam, the superheated steam being the steam that has passed through the hot part, and the fuel supplied to the combustor, wherein
the superheated steam is condensed into a liquid by heat exchange between the superheated steam and the fuel in the fuel preheating step.

* * * * *